(12) United States Patent
Welfeld (10) Patent No.: US 6,424,934 B2
(45) Date of Patent: Jul. 23, 2002

(54) PACKET CLASSIFICATION STATE MACHINE HAVING REDUCED MEMORY STORAGE REQUIREMENTS

(75) Inventor: Feliks J. Welfeld, Ottawa (CA)

(73) Assignee: Solidum Systems Corp., Ottawa (CA)

( * ) Notice: Subject to any disclaimer, the term of this patent is extended or adjusted under 35 U.S.C. 154(b) by 60 days.

(21) Appl. No.: 09/313,183

(22) Filed: May 18, 1999

Related U.S. Application Data (60) Provisional application No. 60/085,907, filed on May 18, 1998.

(51) Int. Cl.[7] .............................. G06F 9/34; G06F 9/44

(52) U.S. Cl. ..................... 703/25; 703/26; 370/389; 709/238

(58) Field of Search ............................. 703/24, 25, 27, 703/26; 370/218, 221, 225, 389; 709/238; 712/236, 239

(56) References Cited

U.S. PATENT DOCUMENTS

| | | | | |
|---|---|---|---|---|
| 5,375,248 A | | 12/1994 | Lemay et al. | |
| 5,414,704 A | * | 5/1995 | Spinney | 370/60 |
| 5,509,006 A | * | 4/1996 | Wilford et al. | 370/60 |
| 5,598,410 A | * | 1/1997 | Stone | 370/469 |
| 5,608,662 A | | 3/1997 | Large et al. | 364/724.01 |
| 5,680,585 A | | 10/1997 | Bruell | 395/500 |
| 5,826,030 A | | 10/1998 | Hebert | |
| 5,867,666 A | * | 2/1999 | Harvey | 395/200.68 |
| 5,892,924 A | * | 4/1999 | Lyon et al. | 395/200.75 |
| 6,091,725 A | * | 7/2000 | Cheriton et al. | 370/392 |
| 6,104,696 A | * | 8/2000 | Kadambi et al. | 370/218 |
| 6,128,296 A | * | 10/2000 | Darawalla et al. | 370/389 |
| 6,167,047 A | * | 12/2000 | Welfeld | 370/389 |

FOREIGN PATENT DOCUMENTS

| | | |
|---|---|---|
| EP | 0 228 053 A2 | 7/1987 |
| EP | 0 266 505 A2 | 5/1988 |
| JP | 5 918 8702 | 10/1984 |

OTHER PUBLICATIONS

Srinivas and Biswas, "Design and Analysis of a Generalized Architecture for Reconfigurable m-ary Tree Structures," IEEE, 1992, pp. 1465–1478.*

Srinivas and Biswas, "A Fast Algorithm for Data Exchange in Reconfigurable Tree Structures," IEEE, pp. 554–564.*

Table Update Serialization Technique, IBM Technical Disclosure Bulletin, vol. 21, No. 3, Aug. 1978, XP002154926, New York, USA, (3 pages total).

Devadas, S., Newton, A.R., "Decomposition and Factorization of Sequential Finite State Machines," International Conference on Computer Aided Design, IEEE Computer Society Press, vol. CONF. 6, Nov. 7, 1988, Washington, pp. 148–151.

Villa, T., Sangiovanni–Vincentelli, A., "Nova: State Assignment of Finite State Machines for Optimal Two–Level Logic Implementation," IEEE Transactions on Computer Aided Design of Integrated Circuits and Systems, vol. 9, No. 9, Sep. 1990, New York, pp. 905–924.

Lam, K., Devadas, S., "Performance–Oriented Decomposition of Sequential Circuits," Proceedings of the International Symposium on Circuits and Systems, IEEE, vol. CONF. 23, May 1, 1990, New York, pp. 2642–2645.

(List continued on next page.)

*Primary Examiner*—Kevin J. Teska
*Assistant Examiner*—Thai Phan
(74) *Attorney, Agent, or Firm*—Freedman & Associates

(57) ABSTRACT

A programmable state machine comprising a program memory and a processor is disclosed wherein the state machine operates with the processor accessing the program memory one or fewer times per state transition and wherein the data stored within the programmable memory is substantially optimized to support reduced memory requirements over those necessary according to the prior art. This is achieved by storing data as tables having a number of elements wherein some tables of data occupy less memory than other tables of data.

29 Claims, 9 Drawing Sheets-

OTHER PUBLICATIONS

Ashar, P., Devadas, S., Newton, A.R., "Optimum and Heuristic Algorithms for Finite State Machine Decomposition and Partitioning," International Conference on Computer Aided Design, IEEE Computer Society Press, vol. CONF. 7, Nov. 5, 1989, Los Alamitos, pp. 216–219.

M.L. Bailey et al., "The x–chip: An Experiment in Hardware Demultiplexing,".

P. Druschel et al., "Network Subsystem Design: A Case for an Integrated Data Path".

D.R. Engler et al., "DPF: Fast, Flexible Message Demultiplexing using Dynamic Code Generation".

Malin Flodin and Niklas Borg, untitled article, Jun. 10, 1997.

H.D. Lambright et al., "APF: A Modular Language for Fast Packet Classification," Aug. 30, 1996.

T.A. Proebsting et al., "Filter Fusion".

I. Wakeman et al., "Implementing Real Time Packet Forwarding Policies Using Streams," Nov. 7, 1994.

S. Wu et al. "A Fast Algorithm for Multi–Pattern Searching," May 1994.

* cited by examiner

Current State Register

Full Width Memory

| width  | 1 | 1 |   | 2w |   |
|--------|---|---|---|----|---|
| ACCEPT | 1 | 0 |   | Classification Tag | |

| width  | 1 | 1 | 1 | w-2 | 1 | w |
|--------|---|---|---|-----|---|---|
| REJECT | 1 | 1 | 1 | xxx | x | xxx |

| width | 1 | w | 1 | w |
|-------|---|---|---|---|
| JUMP  | 0 | next ext. addr | 0 | xxx |

½ Width Memory

| N/A |
|-----|
| N/A |

| 1 | 1 | 1 | w-2 |
|---|---|---|-----|
| 1 | 1 | 1 | xxx |

| 1 | w |
|---|---|
| 0 | next ext. addr |

Extended Address Format

| width | field |
|-------|-------|
| 1 | 1 = half width node, 0 = full width node |
| 1 | 1 = don't care node, 0 = $2^n$ way node |
| w-2 | Node address (See Below) |

Word address is w-2 +n bits wide. Word address for don't care nodes is equal to the node address filled on the left with zeros, for $2^n$-way nodes is formed by concatenating node address shifted n bits left with the current input symbol.

For full width nodes edges are a full word wide and the Current State Register is loaded with the contents of the memory location at the word address.

Fig. 4a

| | | |
|---|---|---|
| Half Width Don't Care | #1<br>#3<br>#5 | #2<br>#4<br>#6 |
| Full Width Don't Care | #1<br>#2<br>#3 | |
| Half Width $2^n$ Way | #1<br>#1<br>•<br>•<br>•<br>#3<br>#3<br>•<br>•<br>• | #2<br>#2<br>•<br>•<br>•<br>#4<br>#4<br>•<br>•<br>• |
| Full Width $2^n$ Way | #1<br>#1<br>•<br>•<br>•<br>#2<br>#2<br>•<br>•<br>• | |

Fig. 4b

| | Address | Left Half | Right Half |
|---|---------|-----------|------------|
| Half Word Don't Care Nodes | 000000 | JMP 00001 Left | JMP 00001 Right |
| | 000001 | JMP 00010 Left | JMP 00010 Right |
| | 000010 | JMP 00011 Left | JMP 00011 Right |
| | 000011 | JMP 00100 Left | JMP 00100 Right |
| | 000100 | JMP 00101 Left | JMP 00101 Right |
| | 000101 | JMP 00110 Left | JMP 00110 Right |
| | 000110 | JMP 00111 Left | JMP 00111 Right |
| | 000111 | JMP 00100 Right | JMP 00111 Left |
| Half Word 2 Way Nodes | 001000 | Reject | Reject |
| | 001001 | JMP 00101 Left | JMP 00101 Right |
| | 001010 | Reject | Reject |
| | 001011 | JMP 00110 Left | JMP 00110 Right |
| | 001100 | Reject | Reject |
| | 001101 | JMP 00000 Left | JMP 00000 Right |
| | 001110 | JMP 00111 Right | ACCEPT A |
| | 001111 | JMP 01000 Left | ACCEPT B |
| | 010000 | ACCEPT C | |
| | 010001 | ACCEPT D | |

Fig. 4c

| | Address | Left Half | Right Half |
|---|---|---|---|
| Half Word Don't Care Nodes | 000000 | JMP 00001 Left | JMP 00001 Right |
| | 000001 | JMP 00010 Left | JMP 00010 Right |
| | 000010 | JMP 0011xx Left | JMP 00011 Right |
| | 000011 | | JMP 0010xx Right |
| Half Word 4 Way Nodes | 000100 | Reject | Reject |
| | 000101 | Reject | Reject |
| | 000110 | Reject | Reject |
| | 000111 | JMP 0010xx Left | JMP 000000 Right |
| | 001000 | Reject | ACCEPT A |
| | 001001 | JMP 00000 Left | ACCEPT B |
| | 001010 | JMP 00000 Left | ACCEPT C |
| | 001011 | JMP 00000 Left | ACCEPT D |
| | 001100 | Reject | |
| | 001101 | JMP 0001xx Right | |
| | 001110 | Reject | |
| | 001111 | JMP 0001xx Right | |

Fig. 4d

| | Address | Left Half | Right Half |
|---|---|---|---|
| Half Word Don't Care Nodes | 000000 | JMP 000001 Left | JMP 000001 Right |
| | 000001 | JMP 010xxx Left | JMP 010xxx Right |
| | 000010 | | |
| | 000011 | | |
| | 000100 | | |
| | 000101 | | |
| | 000110 | | |
| | 000111 | | |
| Half Word 8 Way Nodes | 001000 | Reject | Reject |
| | 001001 | Reject | Reject |
| | 001010 | Reject | Reject |
| | 001011 | Reject | Reject |
| | 001100 | Reject | Reject |
| | 001101 | Reject | Reject |
| | 001110 | Reject | JMP 000000 Right |
| | 001111 | JMP 000000 Left | JMP 000000 Right |
| | 010000 | Reject | ACCEPT A |
| | 010001 | JMP 001xxx Right | ACCEPT B |
| | 010010 | Reject | ACCEPT C |
| | 010011 | JMP 001xxx Right | ACCEPT D |
| | 010100 | Reject | ACCEPT A |
| | 010101 | JMP 001xxx Right | ACCEPT B |
| | 010110 | Reject | ACCEPT C |
| | 010111 | JMP 001xxx Right | ACCEPT D |

PACKET CLASSIFICATION STATE MACHINE HAVING REDUCED MEMORY STORAGE REQUIREMENTS

This appln claims benefit of Prov. No. 60/085,907 filed May 18, 1998.

FIELD OF THE INVENTION

The invention relates to programmable state machines and more particularly to programmable packet classification state machines for use in high-speed communication.

BACKGROUND OF THE INVENTION

A current area of research in high-speed state machine design is the area of digital communications. Commonly, in digital communication networks, data is grouped into packets, cells, frames, buffers, and so forth. The packets, cells or so forth contain data and classification information. It is important to classify packets, cells, etc. for routing and correctly responding to data communications. An approach to classifying data of this type uses a state machine.

For Gigabit Ethernet, it is essential that a state machine operate at very high speeds to process data in order to determine addressing and routing information as well as protocol-related information. Unfortunately, at those speeds, memory access is a significant bottleneck in implementing a state machine or any other type of real time data processor. This is driving researchers to search for innovative solutions to increase classification performance. An obvious solution is to implement a classification state machine completely in hardware. Non-programmable hardware state machines are known to have unsurpassed performance and are therefore well suited to these high data rates; however, the implementation of communication protocols is inherently flexible in nature. A common protocol today may be all but obsolete in a few months. Therefore, it is preferable that a state machine for use with Gigabit Ethernet is programmable. In the past, solutions for 10 Mbit and 100 Mbit Ethernet data networks required many memory access instructions per state in order to accommodate programmability. This effectively limits operating speeds of the prior art state machines.

A programmable state machine for classification of data can be implemented entirely in software. Of course, software state machines are often much slower than their hardware equivalents. In a software state machine, each operation is performed by a software instruction and state changes result in branch operations. As is evident to those of skill in the art, to implement a high-speed state machine in software for packet classification, requires many instructions per second—many more than a billion—requiring expensive parallel processors or technologies unknown at present. In fact, a severe limitation to performance is the speed of memory devices. For example, should a 7 ns memory device be used, less than one memory access per memory device is possible for each bit of a Gigabit Ethernet stream. Thus, if each byte—8 bits—of data is processed in a single state, only one memory access operations is possible for each state. To implement such a system as a purely software solution is unlikely.

Current state of the art integrated memory devices achieve performance in the area of 5 ns per memory access when timing and other factors are taken into account. Therefore, pure hardware implementations of state machines fast enough to implement a Gigabit Ethernet packet classifier are possible so long as only one memory access is required for every 8 bits within the Ethernet data stream. Prior art implementations of such a state machine use a branching algorithm to allow state transitions within the time frame of a predetermined number of bits. The address data for the branching algorithm is stored in program memory. When the predetermined number of bits is 8, each state transition occurs within 8 ns. One method of achieving this performance is to store a table of data having 256 entries for each possible state. The table address is then concatenated with 8 bits from the data stream to determine a next state address. This continues until a value indicative of a classification or a failure to classify is encountered.

Unfortunately, the amount of memory required to implement a system, such as that described above, is prohibitive. For example, using 8 bits at a time requires 256 entries per table, 16 bits at a time requires 65,536 entries. The exact number of tables also depends on a number of terminal states. Since integrated memory having a high storage capacity is not available, implementation of a prior art programmable packet classification state machines having large numbers of edges in integrated memory is currently not feasible.

It would be advantageous to provide a state-machine for classification of bits in a data stream requiring only one memory access to program memory per state transition.

It has been found that a programmable state machine for use in packet classification of high-speed data communications wherein program memory requirements are reduced over program memory requirements of prior art implementations would be highly advantageous.

In order to overcome these and other limitations of the prior art, it is an object of the invention to provide a state machine architecture for supporting implementation of high speed packet classification and providing for reduced memory requirements over those necessary in the prior art.

It is another object of the present invention to provide state machine architecture for supporting implementation of high-speed packet classification and requiring only one memory access to program memory for each state transition.

It is another object of the present invention to provide state machine architecture for supporting programmable high-speed packet classification.

STATEMENT OF THE INVENTION

Accordingly, the invention provides a packet classification state machine for classifying data from a data stream. The state machine comprises:

a) a programmable memory for storing information relating to states within the state machine, the states including a first group of states and a second group of states, the first group of states each represented by a table of data at a table address and including a first plurality of table elements addressable at an offset from the table address, each of the table elements indicative of a next state within the state machine, and the second group of states each represented by a table of data including a table element and occupying less memory than a table of data representing a state of the first group of states; and, b) a processor for determining a next state based on contents of a table element of a present state at an offset from the table address, the offset determined during a table address load portion of an instruction cycle in dependence upon the bits in the data stream, the processor also for switching the state machine into the next state so determined.

According to another embodiment, the invention provides a packet classification state machine for classifying data from a data stream. The state machine comprises:

a) a programmable memory for storing information relating to states within the state machine, the states including three groups of states;

the first group of states each represented by a table of data including $2^n$ table elements addressable at an offset from the table address, the table elements indicative of a next state within the state machine, n bits in the data stream for determining the offset, the second group of states each represented by a table of data including $2^n$ table elements having a size smaller than that of table elements of the first group of states, the table elements addressable at an offset from the table address, the table elements indicative of a next state within the state machine, n bits in the data stream for determining the offset; and the third group of states each represented by data indicative of a single possible next state; and, c) a processor for storing for a table address of the first group a current state address and a plurality of bits from the data stream together to form an address, for a table address of the second group a current state address and a plurality of bits from the data stream together to form an address, and for a table address of the third group a current state address; for retrieving from that address in the programmable memory an operation, the operations comprising a jump operation including data relating to a next state address; for determining the next state based on one of information within the operation; and for switching the state machine into the next state, wherein one and only one operation retrieving information from the programmable memory is performed between successive state transitions.

According to another aspect of the invention, there is provided a method of packet classification for classifying data from a data stream. The method comprises the following steps:

a) providing classification data comprising information relating to states within a state machine, the states including a first group of states and a second group of states, the first group of states each represented by a table of data at a table address including a first plurality of table elements addressable at an offset from the table address, each of the table elements indicative of a next state within the state machine, and the second group of states each represented by a table of data including a table element and occupying less memory than a table of data representing a state of the first group of states;

b) providing a table address of a current state;

c) selecting a table element, the table element selected in dependence upon the table address, the table contents, and an offset based on a plurality of bits in the data stream;

d) determining a next state of the state machine based on the content of the selected element of a present state; and, e) switching the state machine into the next state so determined.

BRIEF DESCRIPTION OF THE DRAWINGS

An exemplary embodiment of the invention will now be described in conjunction with the attached drawings, in which:

FIG. 2b is a simplified diagram of a classification tree for the packet classifications of FIG. 2a;

DETAILED DESCRIPTION OF THE INVENTION

As used herein, the term data packet encompasses the terms buffer, frame, cell, packet, and so forth as used in data communications. Essentially a data packet is a grouping of data that is classifiable according to a predetermined classification. Classifications are commonly codified by standards bodies, which supervise communication standards.

Figure 1A:
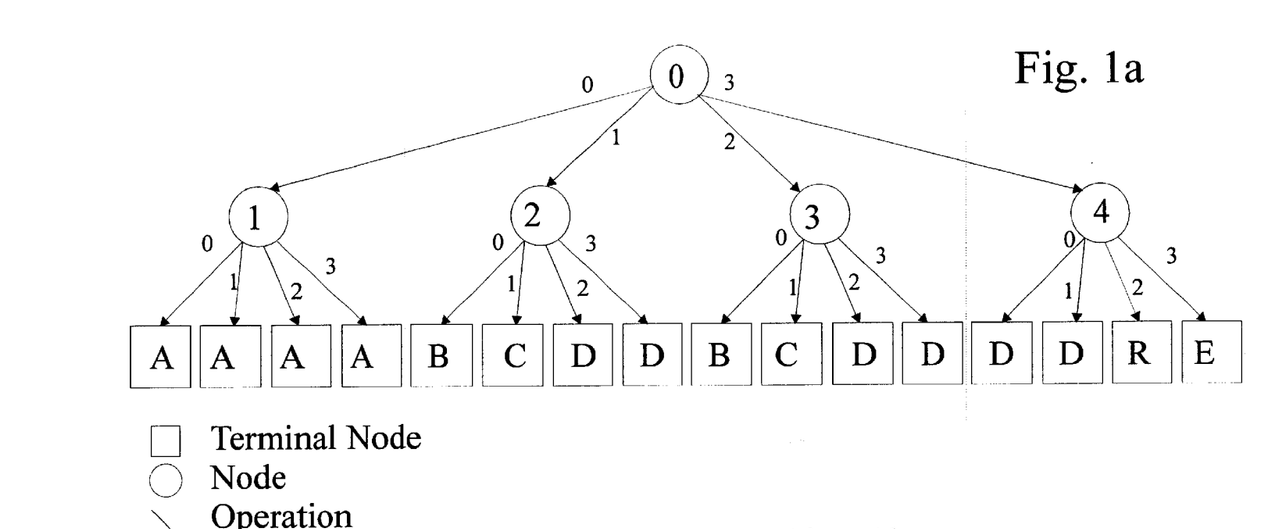
FIGS. 1a and 1b are simplified state diagrams for classification state machines according to the prior art.
Figure 1B:
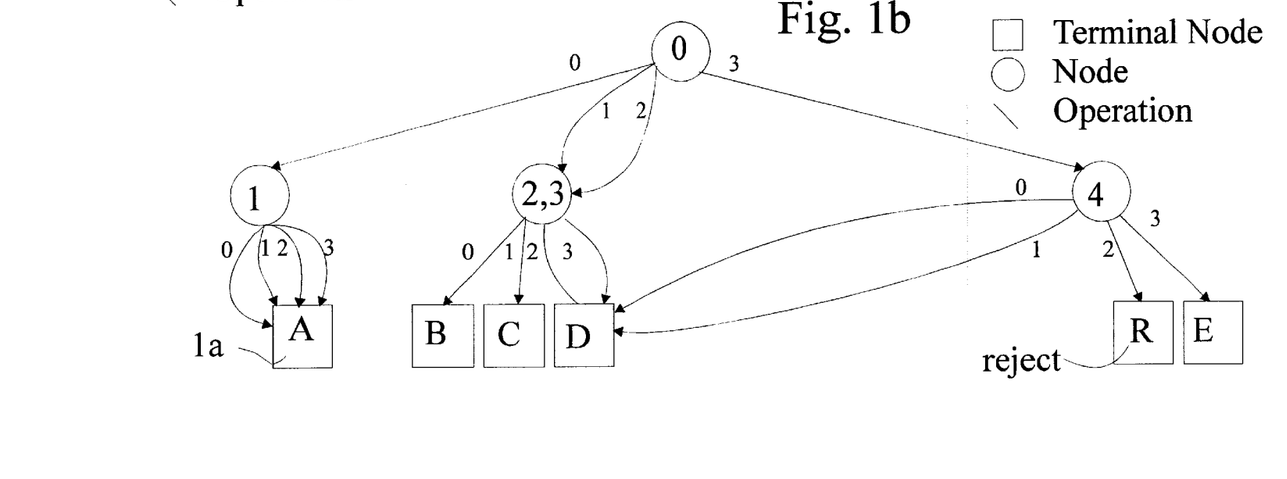

Referring to FIG. 1a a simplified state diagram of a typical classification state machine according to the prior art is shown. Transitions between states are represented by a series of operations shown as lines connecting states shown as circles. The state diagram is for an acyclic state machine and each state is followed by one of a number of possibilities. Such a state machine is easily implemented in either software or hardware. Unfortunately, as the speed of the state machine operation is increased, operations for each state transition must be executed concurrently in order to achieve necessary performance. This bottleneck has, heretofore, required dedicated non-programmable hardware state machine design. In FIG. 1b, a reduced state diagram is shown for the state machine of FIG. 1a. Here, terminal states of the classification A are combined into a single state 1a. Other states are similarly combined. As is evident from the diagram, the number of edges representing state transitions is somewhat reduced—from 20 to 16. Some states, such as state R, are terminal states, ACCEPT or REJECT. Restarting the state machine follows these states. The restart typically occurs before the beginning of the subsequent packet. Typically, there is a means external to the present invention to identify the start of each packet.

Figure 2A:
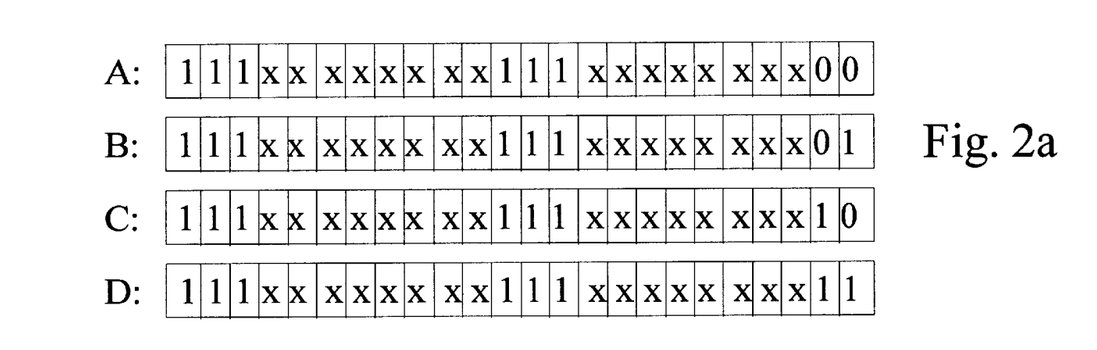
FIG. 2a is a simplified packet descriptor for classifying a packet as one of four classifications—A, B, C, or D.
Figure 2B:
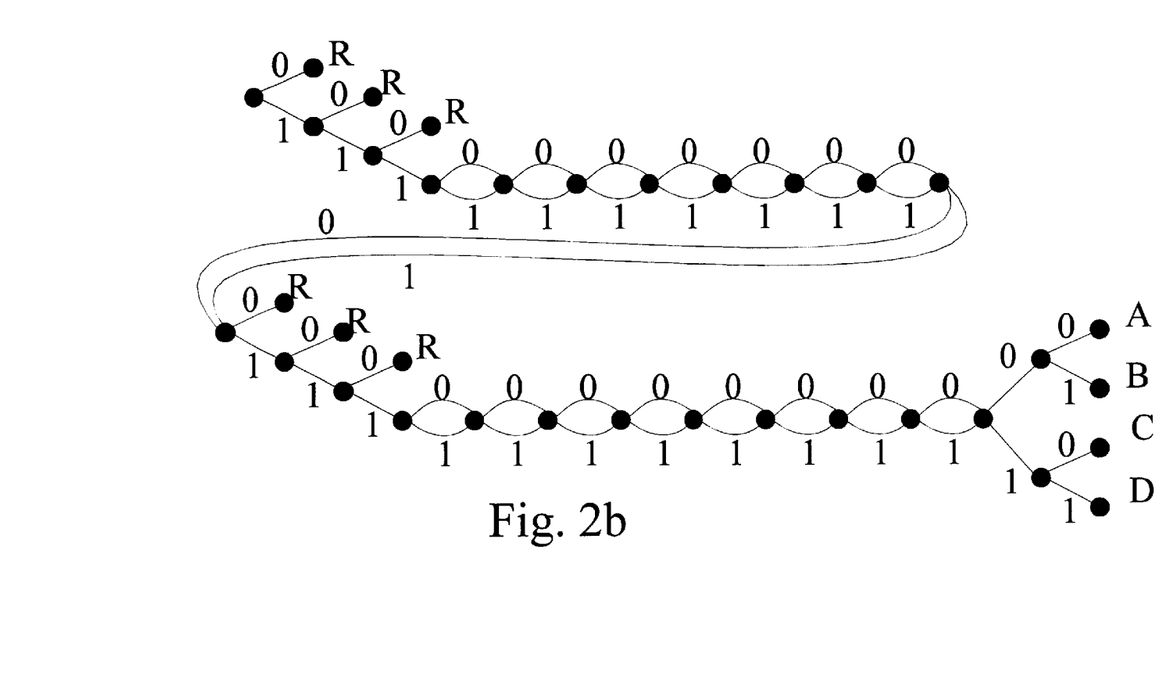

Referring to FIG. 2a, a simplified diagram of a greatly simplified protocol for packet classification is shown. The simplified protocol is used to facilitate understanding of the invention absent detailed knowledge of Ethernet or other communication protocols. Four bit patterns are shown, each representing a different classification. The bit patterns are similar. A first set of three bits must each be one or the data within the data stream remains unclassified. This is followed by 8 bits that are not important to the classification excepting that they occur. Three more bits must each be one and then eight more "don't care" bits. The final two bits are then used to distinguish between the four classifications. In FIG. 2b, a classification tree for implementing a programmable state machine is shown. A typical packet classification tree comprises data relating to a plurality of classification protocols each of which has many bits; the classification tree shown in FIG. 2b is simplified to facilitate explanation of the invention. Typical classification trees result in a very large data structures that are, in many instances, too large to store in a single integrated memory device.

For a gigabit Ethernet a single bit arrives in 1 ns. For a gigabit Ethernet packet classification state machine operating on three bits per state, the first three bits arrive in 3 ns. Once provided to the state machine, there is a lag of 3 ns until a further 3 bits arrive. During those 3 ns, all operations for a state transition are completed. Of course, when more time is required to prepare for a state transition, more bits are grouped together. Thus, depending on the speed of communications, a state machine for classification using two bits at a time is possible as is one using 8 bits or 16 bits at a time. Using embedded memory within the programmable device, fast memory access operations are possible, therefore for eight-bit operation—8 ns per state transition—at most 2 sequential memory access operations from a same programmable memory, and more likely only a single memory access operation, are possible for each state transition.

Such a state is easily implemented in a look-up table having a number of addresses or in another form of address conversion. For a look-up table implementation upon receiving the 8 data bits, only a single memory access is required for determining the next memory address for the look-up table. As an example, a current table address is loaded in the high order bits of a register. 8 bits from the data stream are loaded into the low order bits of the register and act as an offset of 0–255. Once loaded, data at the location indicated by the register is loaded into the higher order bits. It is checked for an accept or reject and the next 8 bits from the data stream are loaded into the low order bits to form a new address. This continues until a terminal state is reached.

As described above for large numbers of bits, look-up table storage becomes very large and results in increased costs and reduced performance by forcing the use of external memory devices. Therefore, it is evident that there is a practical limitation to the number of bits that may be processed in parallel in a programmable state machine. Also, since memory circuitry capable of supporting necessary speeds is currently limited to integrated memory circuitry, there is a limitation on the amount of memory that is available as classification data. Because of this limitation, memory optimization provides significant advantages.

Figure 2C:
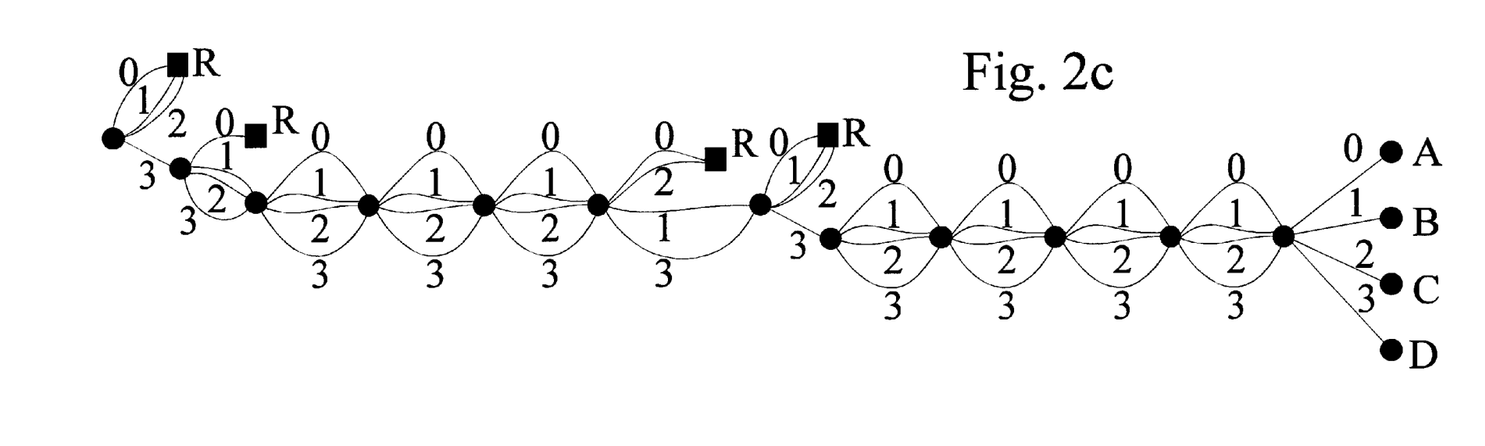
FIG. 2c is a classification tree equivalent to that of FIG. 2b shown using 2 bits per symbol.
Figure 2D:
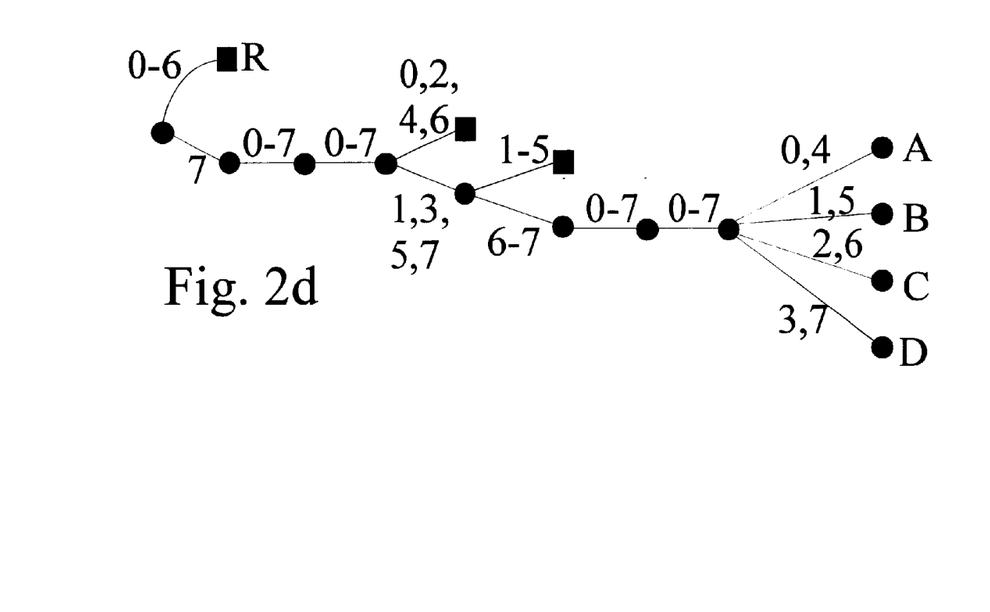
FIG. 2d is a classification tree equivalent to that of FIG. 2b shown using 3 bits persymbol.

For packet classification state machines, the resulting state is of significance for determining an operation or a packet class. As such, packet classification state machines follow a tree structure. When each node of the tree relates to one bit as shown in FIG. 2b, the tree is very large and has many nodes, each node having two child nodes and one parent node. When each node relates to 8 bits, the tree has far fewer levels, but actually has a similar number of edges. In FIGS. 2c and 2d two bits and three bits, respectively, relate to each node. As is evident to those of skill in the art, many nodes are of no consequence and, hence, optimization of those nodes, which are useful in packet classification is an important aspect of a programmable state machine for this purpose.

A preferred method of classification data optimization makes use of novel memory optimization techniques in order to provide reduced classification tree data having same information therein. Referring to FIGS. 2b, 2c, and 2d, alternative representations of the same classification tree are shown. As is evident, there are a number of nodes that require more or less information than others. This is used, according to the present invention, in order to optimize memory storage requirements. For example, storing each node having only one possible next node—each edge from the node is to a same destination node—as a single edge reduces the number of edges in FIG. 2b from 50 to 34. This is a significant reduction in overall storage requirements. Of course, using a different number of edges per node, results in different savings. As examples, the same optimisation technique reduces the number of edges in the tree of FIG. 2c from 48 to 27 and in the tree of FIG. 2d from 64 to 36.

The preferred method also groups nodes into several categories each requiring a different amount of storage—full width nodes; half width nodes; full width don't care nodes, half width don't care nodes, and so forth. By having different nodes occupying different amounts of memory, memory requirements are significantly reduced. Further, the representation of data as one of the groups is easily distinguishable. Where four groups exist, two bits are sufficient to classify an element into a group. Memory optimization is preferred since, as disclosed above, once external memory is used performance is decreased. Of course, other forms of optimizing memory usage are also applicable in association with the present invention.

For implementation of a tree traversal method according to the invention, it is preferable that every edge extending from a node—every address—is individually addressable whether it is a full width edge or a half width edge and whether it is word aligned or not. For example, full width nodes are word aligned and require, for a $2^n$ way node, $2^n$ words.

Half width nodes are either word aligned or half word aligned. This allows a consistent concatenation of bits from the data stream for full width and half width nodes where, for half width nodes, a bit selects between right half of a word and left half thereof— half word aligned and word aligned, respectively. Of course, for full width nodes, no extra bit is necessary. In the diagrams of FIG. 4, half width nodes are shown as $2^n$ half words aligned either left or right within a word. Alternatively, half width nodes are word aligned—for a two edge pair—and, for a $2^n$ way node, require $2^{n-1}$ words.

In order to support speeds required for Gigabit Ethernet, it is preferable to handle all bit manipulation in a single stage. In order to accomplish this, each edge includes information distinguishing the group of the node to which the edge extends. This additional information includes the two bits described above and, for half width nodes, a bit indicative of right half word or left half word. A half word is referred to herein as a byte regardless of its size. Since half width nodes are byte aligned and, a word is read for each state transition, it is useful to select the appropriate byte for a current node. A preferred method of doing so is described below with reference to FIG. 4.

In an embodiment of a packet classifier with substantially optimized memory usage and capable of supporting high-speed packet classification, the following edge contents of a classification tree are used: ACCEPT, REJECT, and JUMP. Of course, other operations are possible. Some operations may require more or less data bits and therefore may necessitate other groups of nodes.

ACCEPT indicates that a packet is classified—a leaf of the classification tree is reached—and that appropriate action for the classified packet is desired. Some forms of appropriate action include passing a classification tag to a system or user, passing the packet to a predetermined routine, pushing the packet onto an application stack for a known application, and so forth. Packet processing is well known in the art of Ethernet communication.

REJECT indicates that a packet is not of a classified packet type. As such no "appropriate" action is performed, though a default action is desirable in many situations. For example, a reject tag is provided to a system or user to indicate that classification was unsuccessful.

JUMP affects the contents of a current status register. In effect, this operation results in a change of the current node and therefore of the current state. A JUMP operation loads an address contained in the word with the JUMP operation into the status register. This results in a change of state—a change to a different node within the classification tree. As such, a memory access is performed to retrieve the edge information and a further register to register transfer is performed to load new contents into the status register. Using a packet classification state machine designed specifically to implement the present invention, these actions are easily performed within existing time constraints. The inclusion of a command and data required to complete the command within a same word of data enables this performance.

Figure 3:
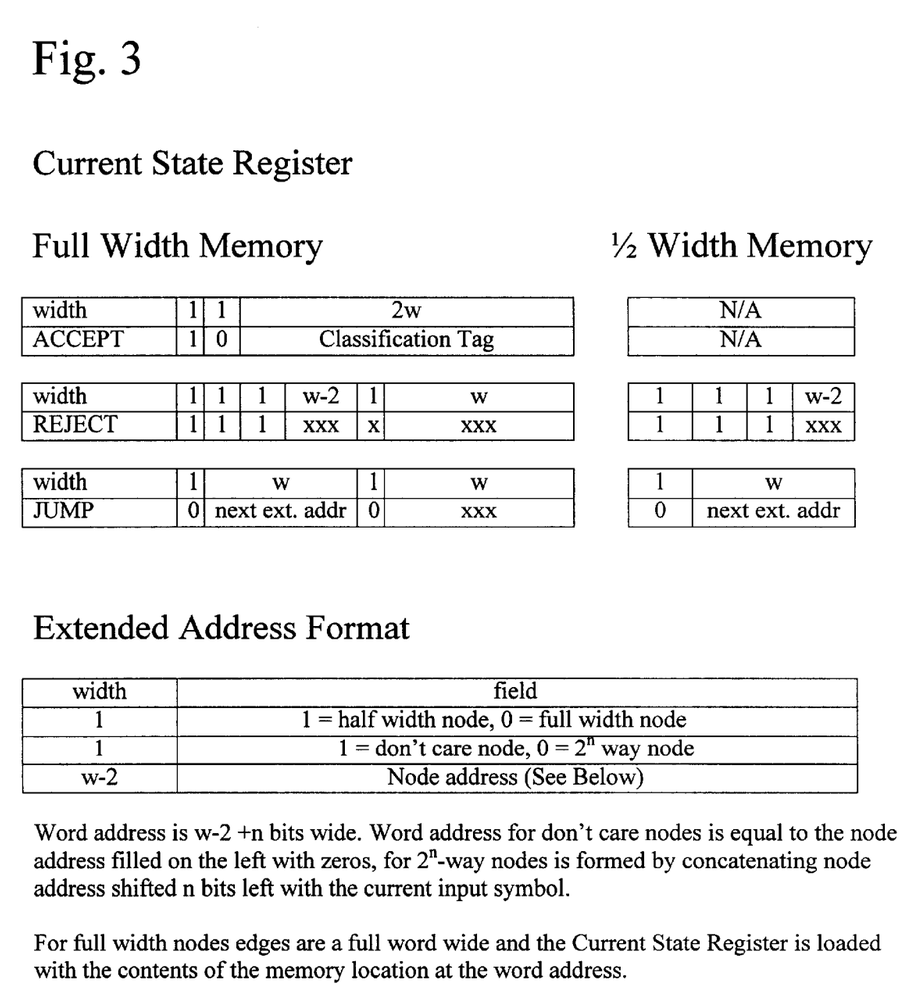
FIG. 3 is a table indicating memory usage and opcodes for an exemplary embodiment of a state machine according to the invention.

Referring to FIG. 3, a table shows memory word contents. Each word in a full width node comprises 2w+2 bits, where w is sufficient number of bits to represent an address within the classification tree—within the state machine. As is evident from the table, other than the ACCEPT command, all other commands fit within a half word. Alternatively, some memory addresses are represented by more than w bits and some JUMP operations are full width. This is significant for state machine optimization. As shown, the width need not include the lower order bits, which are inserted from the data stream being classified.

It is noteworthy that when half width node data is stored contiguously—two table elements in a same table forming a single word—the lowest order bit from the data stream indicates right or left half word and, therefore, until that bit is loaded, setup of the bit shifting or multiplexing necessary for loading the desired half word can not commence. Alternatively, when all edges relating to a given node are stored in either the right or left byte, the lowest order bit, other than those inserted from the data stream, of an address of a half width node is indicative of a half word left or right—high order or low order respectively. In order to facilitate operation of the state machine, it has been found that storing all edges relating to a given node in either the right or left byte and distinguishing right and left using a bit within the node data instead of the lowest order bit, allows set up of the data path to occur before data is read and therefore improves overall performance.

Preferably, an indication that a node is half width, full width, or don't care is registered and stored for use in the subsequent state. Stored in memory is node information of a direct acyclic state machine. Preferably, protocol descriptions are provided and during configuration, those protocols that are selected are compiled into a classification tree, optimised, and stored in programmable memory of the state machine device. Nodes of the state machine have two of the following formats resulting in four possible formats: full width/half width, and don't care/$2^n$ way. Each of these node formats is related to a format for storing edge information extending from the nodes. Don't care nodes have one edge to a following state node. $2^n$ way nodes have $2^n$ edges. Full width nodes are implemented such that each edge is allocated a complete word, while half width nodes store information relating to each of two edges within a single word. Basically, some edge information requires a half word of information or less and others require more. When a single edge from a node requires more than a half word of information for implementation, then all edges from the node are full width. Otherwise, the edges are optimized to half width. Also, where all edges from a node are identical, storage is reduced to a single edge. Of course, other node types having other memory storage optimizations are possible within the scope of the invention.

Figure 4A:
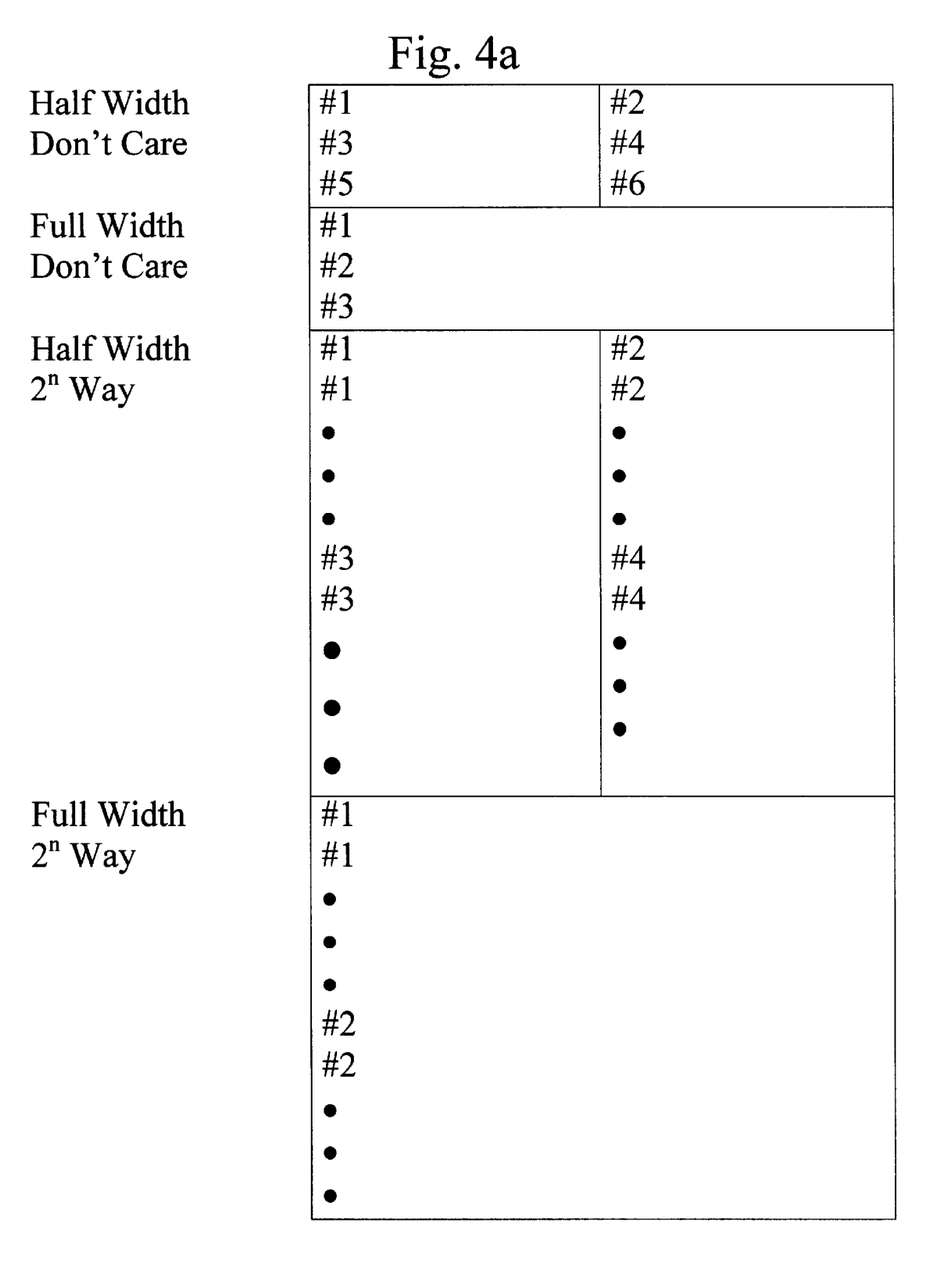
FIG. 4a is a simplified memory diagram for a state machine memory according to the invention.

Referring to FIG. 4a, a memory map of packet classification data memory according to the invention is shown. The memory is divided into four areas. The areas support the four formats of nodes—don't care nodes, both full width and half width, and $2^n$ way nodes, both full width and half width. Each JUMP instruction has two additional bits to identify the type of the next node—don't care/$2^n$ way and full/half width. For half width nodes, another bit indicates the alignment as word aligned or right aligned (half word aligned).

Figure 4B:
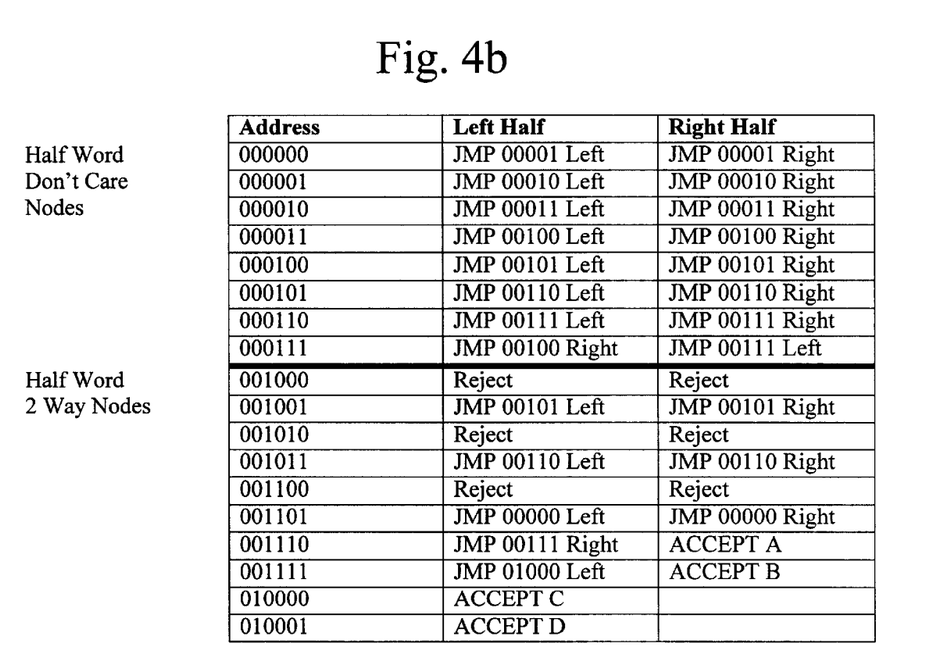
FIG. 4b is an address table for a classification tree implemented for the classification tree of FIG. 2b.
Figure 4C:
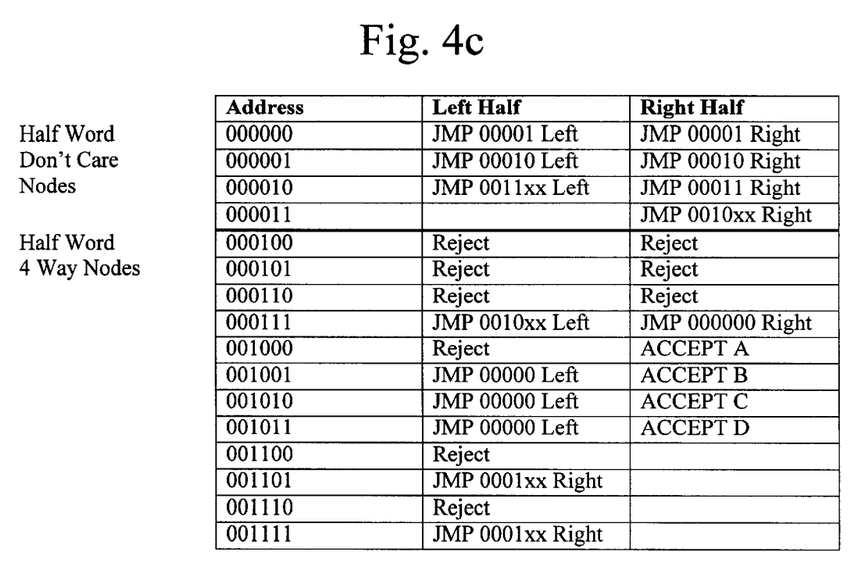
FIG. 4c is an address table for a classification tree implemented for the classification tree of FIG. 2c.
Figure 4D:
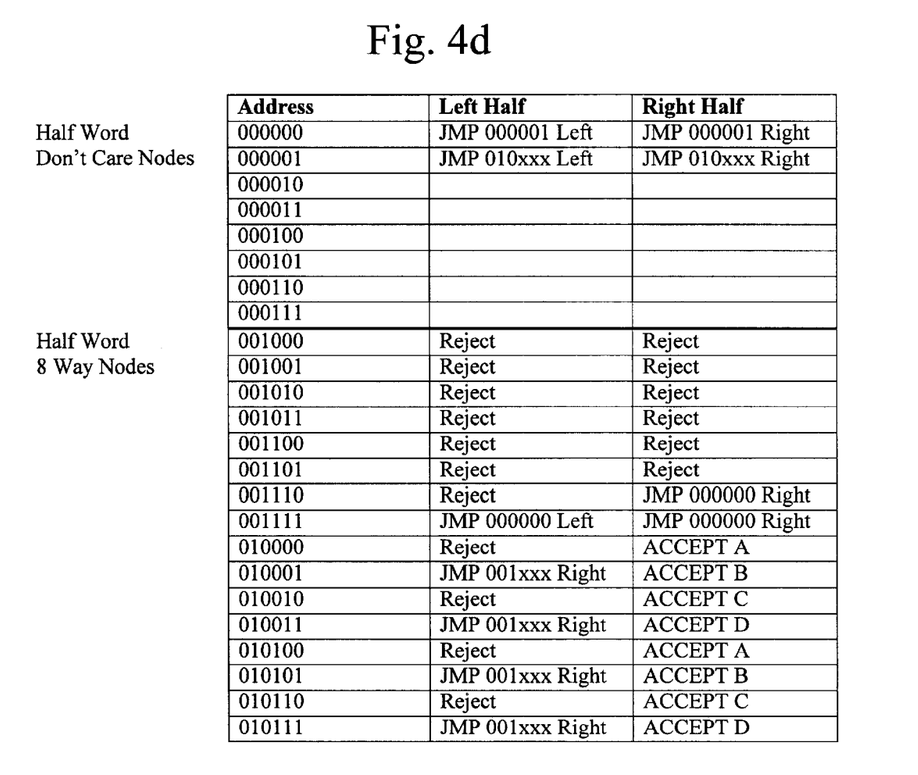
FIG. 4d is an address table for a classification tree implemented for the classification tree of FIG. 2d.

Optimization of the data representation of a state machine according to the invention is described below with reference to the classification tree diagrams of FIGS. 2b, 2c, and 2d. Resulting memory contents are shown in FIGS. 4b, 4c, and 4d, respectively. Because the classification tree data structure is so small, it is difficult to see the memory savings that result. For example, looking at FIG. 4d, it appears that significantly more memory is necessary for the $2^3$ way tree than for a 2 way tree. When analysed, it is evident that much of the memory space is unused. A large tree would likely use the space more efficiently. Also of note, though the overall number of nodes is greatly reduced in the tree of FIG. 2d, the corresponding memory requirements are similar. Without memory optimisation, the tree of FIG. 2b requires storage for 50 edges and the tree of FIG. 2d requires storage for 64 edges. Therefore, maintaining similar memory storage requirements for a tree having more edges per node is advantageous.

In each of the tables of FIGS. 4b, 4c, and 4d, half width don't care nodes are situated above the dark line and half width $2^n$ way nodes are below the line. Since the first node is a $2^n$ way node it is shown at the first address on the left (word aligned) below the dark line in each of the tables. Also, when ACCEPT operations are full width, a full width node section of memory would exist. Here, since only four classes exist, half width ACCEPT instructions are supported.

Referring to FIG. 4b, the state machine begins at address 00100x. The lowest order bit, shown as an x, is concatenated from the data stream. This results in an instruction—here a Reject or a JMP. The instruction is retrieved and executed.

Figure 5:
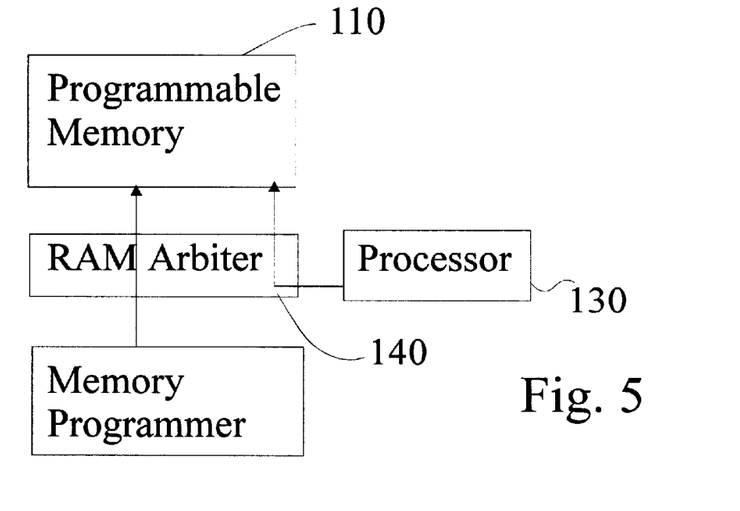
FIG. 5 is a simplified block diagram of an integrated circuit implementation of an acyclic classification state machine according to the invention.

A simplified block diagram of a classification state machine according to the invention is shown in FIG. 5. The state machine is useful for classifying data from a data stream and in particular for classifying data packets. The state machine, as shown, is integrated within a single integrated circuit 100. The integrated circuit 100 comprises a programmable memory 110, a processor 130, and a programmable memory arbiter 140.

The programmable memory 110 in the form of fast static random access memory (RAM) is preferred, since static RAM is capable of achieving performance speeds that enable support of high-speed operation. Of course for low speed operation, such as that necessary for operating a 10 Mbit Ethernet packet classification state machine, known DRAM circuitry is used to increase densities and decrease costs. The RAM 110 is for storing information relating to classification of stream data—classification tree data. Alternatively stated, the RAM 110 is for storing data relating to states within the state machine.

For example, in the RAM 110 data relating to each state machine node is stored. The data is stored in tables, each table having a table address and a table format. The RAM 110 is accessible by the processor 130 one time per state transition. Also, the processor 130 has a highest priority when accessing classification data within the RAM 110. This ensures that no other RAM access operations affect state machine performance. The programmable memory arbiter 140 controls access to the RAM 110. The programmable memory arbiter 140 ensures that reprogramming of the RAM 110 does not effect performance of the state machine. Effectively, at low speeds the arbiter 140 guarantees the processor a single access to the RAM 110 for every state transition. For faster data rates, the arbiter prevents RAM access operations other than by the processor 130 while classification operations are underway. This essentially limits reprogramming of the programmable memory 110 to times when the state machine is disabled to allow for reprogramming or when incoming data is part of a classified packet, there are no packets requiring classification. A state machine is commonly disabled to allow reprogramming when it is used in security applications requiring changes in programmable memory contents due to security concerns.

The processor 130 is for retrieving information from the programmable memory 110 one or fewer times per state transition. Preferably, a single access to programmable memory occurs for each state transition during classification. Of course, once data is classified, there is a pause in state machine operation until a next packet commences. During this pause, the RAM arbiter 140 allows programming of the RAM 110. Thus, even at very high speeds, the state machine is fully programmable.

The processor retrieves data from the RAM 110 and uses the data to perform an operation for determining a next state and then switches the state machine into the next state so determined.

Though herein the ACCEPT operation is provided with a small amount of bits for indicating a classification, this is optionally increased in any of several ways. In a first way, an ACCEPT operation is implemented with a value that is an index to a classification, thereby allowing lengthy classification codes. Alternatively, ACCEPT operations are implemented using full width nodes providing an extra w bits for classification results. Of course, the two methods may be combined.

Preferably, the arbiter 140 provides transparent access to the programmable memory 110 for the processor 130. This is achieved by blocking memory access operations for reprogramming the program memory 110 when a memory access from the processor 130 is a potential operation. Since the processor 130 is provided highest priority, it is essential that it not be blocked in attempting to access the programmable memory 110. Alternatively, other methods of arbitrating between ports are employed.

Of course, since the processor does not access programmable memory 110 more than one time per state transition, when more than a single RAM access is possible per state transition, the processor is allocated one access to programmable memory 110 and reprogramming the programmable memory is performed during other accesses to the memory for a same state transition.

When new packet data is detected, the processor is provided with a start address for beginning classification operations. The start address is programmable and is used in accordance with a method of reprogramming the programmable memory as described below.

Clock sources for use according to the invention are selected based on an application and based on current knowledge within the art. Selection and implementation of clock sources and of methods of synchronizing clocks to network provided clock sources are well known in the art of communication hardware design.

Unlike conventional solutions for Gigabit Ethernet that depend upon either a fast host CPU, or an imbedded CPU to examine each frame at or near real time, the present invention scales easily to gigabit rates. A CPU 10 times faster per port is not economical. Further, required processing speed varies with complexity of classification criteria. These limitations are not present according to the present invention.

Figure 6:
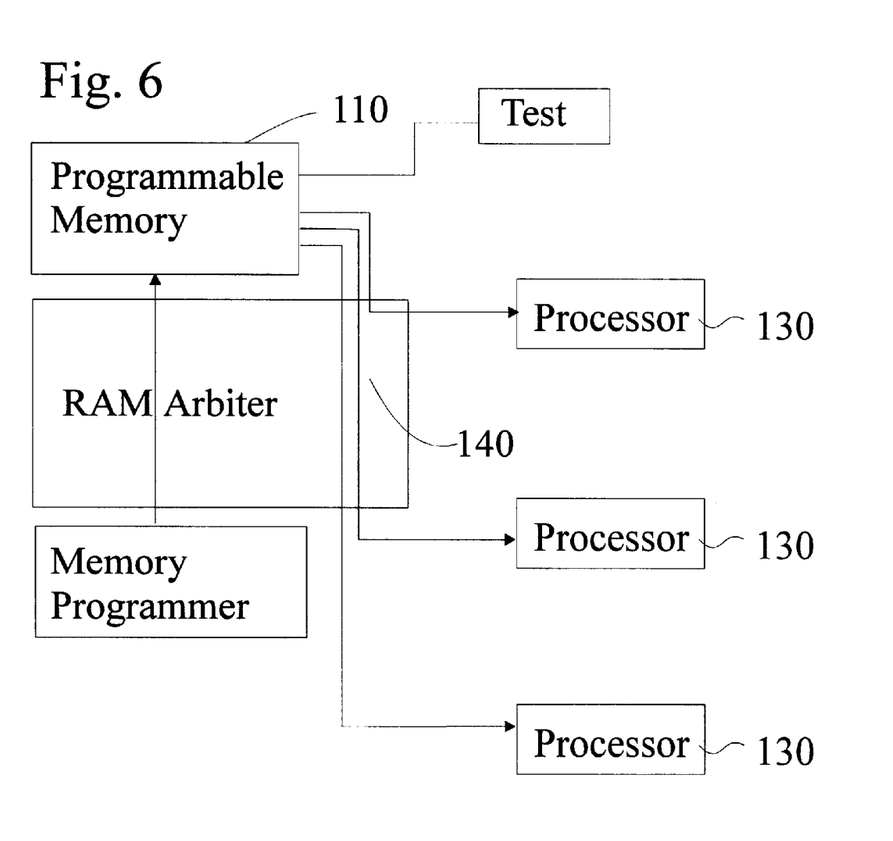
FIG. 6 is a simplified diagram of a system according to the invention of implementing a plurality of state machines using a single same programmable classification data memory.

In an alternative embodiment, when implementing a 10 Mbit Ethernet packet classification state machine, several processors use a same programmable memory 110. This is shown in FIG. 6. The resulting system has a plurality of processors 130, and a single programmable memory 110. Each state machine is simultaneously classifying data according to a different classification tree structure. Alternatively, several processors follow a same classification tree structure. Also, classification data associated with each processor is independently programmable.

Reprogramming of the program memory 110 is accomplished by adding new table data relating to changes in the classification tree structure of one or more state machines from an existing node in the tree back toward the root of the tree. The root address is then provided as a start address to the processor executing that state machine. When tables stored within the programmable memory 110 are no longer used by any processor, those memory locations are reused during subsequent reprogramming. In this way, programming occurs during operation of the state machines without affecting existing programming or existing classification operations.

Because of the above, it is important to automate, so much as possible, the classification data table generation and optimization process. Once automated, the specification of packet classification is unimportant in a procedural sense and becomes a process of pattern matching. Essentially, tree construction is a matter left to a packet classification program compiler. Of course, a similar system is applicable to filtering which is considered packet classification with two classes—accept and reject.

By applying memory optimization techniques in accordance with the invention, significant memory optimization occurs. This permits implementation of an integrated programmable packet classification state machine according to the invention. In order to achieve reasonable performance and cost, it is useful to optimize the table data generated by condensing tables into a smallest representation from a group of representations. Of course, where desired, other representations are used. Also, further optimization or less optimization is used depending on a particular application.

Preferably, compiler software maintains an image of the data within the programmable memory and determines memory in use and memory locations, which are no longer part of any state machine classification data. In this way, frequency of memory overflow is reduced by allowing reuse of memory once its contents are obsolete. Though this appears straightforward, because the present invention supports incremental programming and the program memory can support a plurality of processors, it is very useful to track memory allocation automatically.

Though the preferred embodiment uses a single access by the processor to programmable memory per state transition, the invention may also be implemented where unnecessary accesses to the programmable memory are replaced with, for example, a counter. Thus when four Don't care states are in succession, a count command is loaded with a count number, 4, and a next address. Data from the next address within programmable memory is retrieved once the counter has completed counting the specified number. For a single Don't care, this eliminates a single memory access.

As is evident to those of skill in the art, the programmable memory is accessed for read purposes by the processor of the state machine. The state machine processor does not write to the programmable memory. Conversely, the programming of the programmable memory only requires write operations. Therefore a memory having a write access and a separate read access—dual port—is applicable to the invention. In a further alternative embodiment, true dual port memory is used and memory arbitration is unnecessary or is provided within the memory circuitry. Alternatively, programming and diagnostics uses read write access to the programmable memory while the processor has read access to the programmable memory.

Preferably, the invention is implemented within a custom IC such as an ASIC. For example, when migrating to gigabit data rates, more efficient handling of frames rejected by the classification process is achieved by incorporating the classification system within a MAC. Once a rejection decision is made, the MAC stops DMA of the incoming frame into host memory or if DMA has not started flushes the frame from it's queue. The same receive descriptor is then used without any involvement of the driver software, thereby, reducing traffic on a host's bus.

There are several other benefits of integrating the method according to the invention inside the MAC. These include: elimination of a host bridge reducing host bus loading by loading the pattern memory through the MAC's interface; no storage required for associating classification results with a ring descriptor as required when using a separate classification component since the association is obvious; and benefits of caching are maximized because the receive ring descriptor is located anywhere that the driver desires.

Alternatively, when implemented within an FPGA, the design is preferably optimized for implementation within the type of FPGA used.

It is also possible to implement don't care bits using a don't care mask such that individual bits are "do care" bits and others are "don't care" bits. This is a straightforward issue when the don't care bits fall at either end of the table element data. In order to implement this functionality for bits in the middle of a table element data value, a shift operation is performed dependent upon the mask data in order to align the bits appropriately and adjacent one another. Because of the speed requirements of the classification state machine, such a shift operation likely requires significant hardware. Using this approach, for a 32 bit packet classification engine, a single don't care bit eliminates $2^{31}$ possibilities.

Numerous other embodiments of the invention are envisioned without departing from the spirit or scope of the invention.

What is claimed is:

1. A classification state machine for classifying data from a data stream, the state machine comprising:
    a) a programmable memory for storing information relating to states within the state machine, the states including a first group of states and a second group of states,
        the first group of states each represented by a table of data at a table address and including a first plurality of table elements each addressable at a different offset from the table address, each of the table elements indicative of a next state within the state machine, and
        the second group of states each represented by a table of data including a table element and occupying less memory than a table of data representing a state of the first group of states; and,
    b) a processor for determining a next state based on contents of a table element of a present state at an offset from the table address, the offset determined during a table address load portion of an instruction cycle in dependence upon sequential bits in the data stream, the processor also for switching the state machine into the next state so determined,
    wherein some of at least one of the first group of states and the second group of states include table elements indicative of a data classification terminal, and
    wherein when the determined next state is based on a table element indicative of a data classification terminal, the data within the data stream is so classified.

2. A packet classification state machine for classifying data as defined in claim 1 wherein table elements comprise data relating to the format of table elements of a next state.

3. A packet classification state machine as defined in claim 1 wherein each table of data representing a state of the first group of states occupies a same amount of memory and has a same number, n, of table elements.

4. A packet classification state machine as defined in claim 3 wherein each table of data representing a state of the first group of states comprises 2N table elements wherein N is a number of bits used by the processor to determine the offset from the table address.

5. A packet classification state machine as defined in claim 3 wherein each table of data representing a state of the second group of states occupies a same amount of memory and comprises only one table element.

6. A packet classification state machine as defined in claim 1 wherein the processor comprises means for determining a size of table elements within a table and for loading an element of the determined size.

7. A packet classification state machine as defined in claim 6 wherein the means for determining a size of table elements within a table includes means for determining an alignment of table elements within data words and for loading contents of a table element of the determined size having the determined alignment.

8. A packet classification state machine as defined in claim 5 wherein each table of data representing a state from the second group of states comprises data indicative of only one next state.

9. A classification state machine according to claim 1 comprising a signal port for receiving a packet start identification signal and wherein in use data within a data stream is classified in response to a packet identification signal provided from other than the state machine.

10. A method of data classification for classifying data from a data stream, the method comprising the steps of:
    a) providing classification data comprising information relating to states within a state machine, the states including a first group of states and a second group of states,
        the first group of states each represented by a table of data at a table address including a first plurality of table elements each addressable at a different offset from the table address, each of the table elements indicative of a next state within the state machine, and the second group of states each represented by a table of data including a table element and occupying less memory than a table of data representing a state of the first group of states,
wherein some of at least one of the first group of states and the second group of states include table elements indicative of a data classification terminal;

b) providing a table address of a current state;

c) selecting a table element, the table element selected in dependence upon the table address, the table contents, and an offset based on a plurality of bits in the data stream;

d) determining a next state of the state machine based on the content of the selected table element of a present state; and, e) switching the state machine into the next state so determined.

11. A method of packet classification for classifying data from a data stream as defined in claim 10 wherein the steps (c), (d) and (e) are performed iteratively and wherein the step of (e) switching the state machine into the next state comprises the step of providing the table address of the table representing the next state as the table address of the current state for a next iteration.

12. A method of packet classification for classifying data from a data stream as defined in claim 10 wherein the step of determining a next state of the state machine is performed, for a state in the first group of states, by concatenating the table address and the bits in the data stream to form an element address, data within memory at the element address indicative of the next state.

13. A method of packet classification for classifying data from a data stream as defined in claim 10 wherein the bits are consecutive bits within the data stream.

14. A method of packet classification for classifying data from a data stream as defined in claim 13 wherein the step of determining a next state of the state machine is performed, for a state in the first group of states, by concatenating the table address and the consecutive bits in the data stream to form an element address, data within memory at the element address indicative of the next state.

15. A method of packet classification as defined in claim 10 wherein the steps (c) and (d) are performed per state transition.

16. A method of packet classification as defined in claim 10 wherein the classification data is an acyclic classification tree.

17. A method of packet classification as defined in claim 16 wherein the classification data is optimized by determining states having only one possible next state and storing them as tables representing states of the second group of states.

18. A method of packet classification as defined in claim 16 wherein some information relating to a state is a don't care operation and wherein some information relating to the previous state indicates that the next state comprises a don't care operation, wherein the state comprises fewer table elements than a state absent a don't care operation.

19. A method of packet classification as defined in claim 16 wherein some information relating to a state is a counter indicating a subsequent number of don't care operations.

20. A method of packet classification as defined in claim 10 wherein the first group of states is represented by a table having elements with a width of m bits and the second group of states is represented by a table having elements with a width of approximately m/2 bits.

21. A method of packet classification as defined in claim 20 wherein each of the first group of states and the second group of states is represented by a table having $2^n$ table elements wherein n is a number of bits within the data stream in dependence upon which the table element is selected.

22. A method of packet classification as defined in claim 10 wherein the information relating to states within a state machine is stored in a memory and wherein the information includes information relating to alignment of table elements within the memory.

23. A method of packet classification as defined in claim 22 wherein a table of table elements is stored within the memory with a same alignment.

24. A method of packet classification as defined in claim 10 wherein the information relating to states within a state machine includes information relating to width of table elements relating to a next state.

25. A method of data classification according to claim 10 wherein data within a data stream is classified in response to a packet identification signal provided from other than the state machine.

26. A data classification state machine for classifying data from a data stream, the state machine comprising:

a) a programmable memory for storing information relating to states within the state machine, the states including three groups of states;
the first group of states each represented by a table of data including $2^n$ table elements addressable at an offset from the table address, the table elements indicative of a next state within the state machine, n bits in the data stream for determining the offset,
the second group of states each represented by a table of data including $2^n$ table elements having a size smaller than that of table elements of the first group of states, the table elements addressable at an offset from the table address, the table elements indicative of a next state within the state machine, n bits in the data stream for determining the offset; and
the third group of states each represented by data indicative of a single possible next state,
wherein some data relating to some states is indicative of a data classification terminal indicative of a data classification; and, c) a processor for storing for a table address of the first group a current state address and a plurality of bits from the data stream together to form an address, for a table address of the second group a current state address and a plurality of bits from the data stream together to form an address, and for a table address of the third group a current state address; for retrieving from that address in the programmable memory an operation, the operations comprising a jump operation including data relating to a next state address; for determining the next state based on one of information within the operation; and for switching the state machine into the next state,
wherein one and only one operation retrieving information from the programmable memory is performed between successive state transitions.

27. A packet classification state machine for classifying data from a data stream as defined in claim 26 comprising:
means for determining a group of a table relating to a next state.

28. A packet classification state machine for classifying data from a data stream as defined in claim 26 comprising:
means for determining alignment of a table relating to a next state.

29. A classification state machine according to claim 26 comprising a signal port for receiving a packet start identification signal and wherein in use data within a data stream is classified in response to a packet identification signal provided from other than the state machine.

* * * * *

UNITED STATES PATENT AND TRADEMARK OFFICE
CERTIFICATE OF CORRECTION

PATENT NO.     : 6,424,934 B2
DATED          : July 23, 2002
INVENTOR(S)    : Welfeld It is certified that error appears in the above-identified patent and that said Letters Patent is hereby corrected as shown below:

<u>Column 12,</u>
Line 32, the term "2N" should read -- $2^N$ --
Line 48, the term "claim 5" should read -- claim 1 --

Signed and Sealed this

Fifteenth Day of July, 2003

JAMES E. ROGAN
*Director of the United States Patent and Trademark Office*